Aug. 20, 1968  F. PFEFFER  3,397,649
TRANSPORT SYSTEM FOR PASSENGERS AND GOODS
Filed Dec. 1, 1965  12 Sheets-Sheet 1
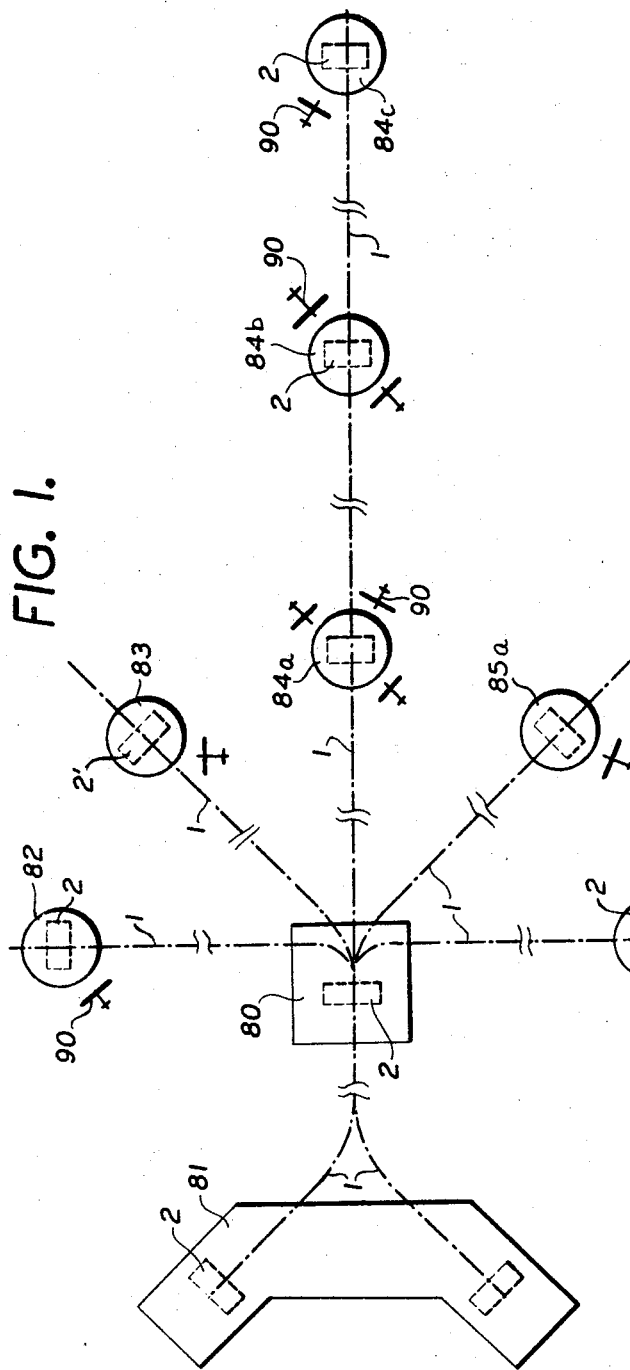
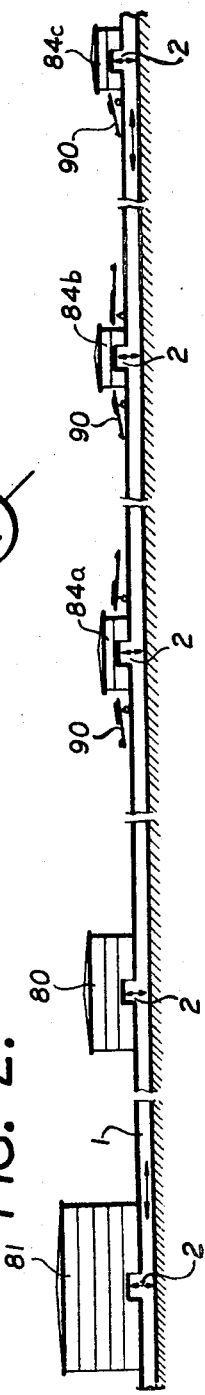
INVENTOR
FRITZ PFEFFER
BY *Ernest F. Marmorek*
ATTORNEY.

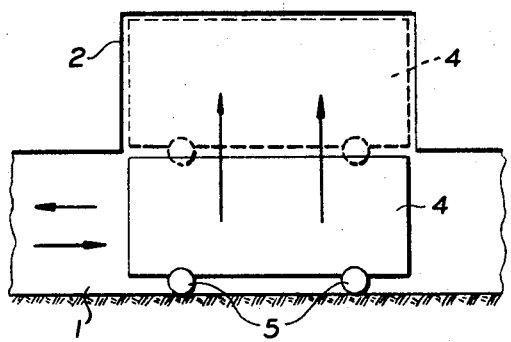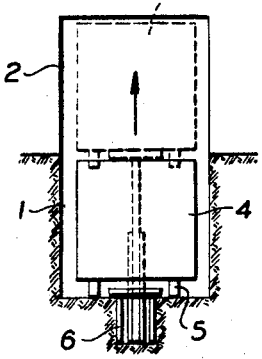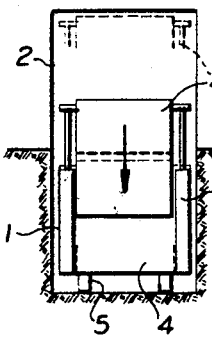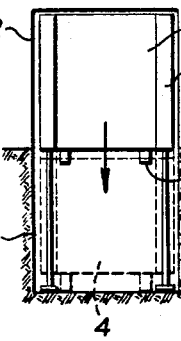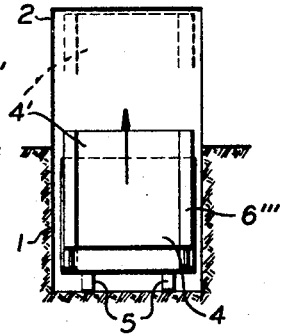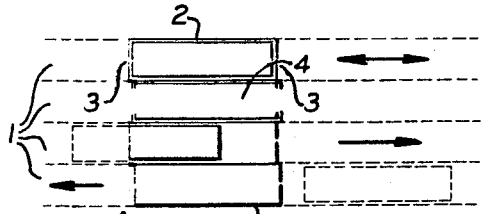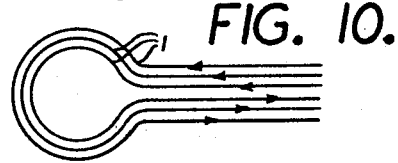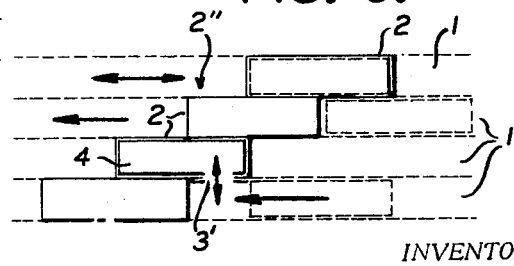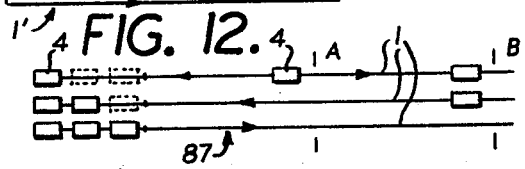

Aug. 20, 1968   F. PFEFFER   3,397,649
TRANSPORT SYSTEM FOR PASSENGERS AND GOODS
Filed Dec. 1, 1965   12 Sheets-Sheet 3

INVENTOR.
FRITZ PFEFFER
BY
. ATTORNEY.

Aug. 20, 1968  F. PFEFFER  3,397,649
TRANSPORT SYSTEM FOR PASSENGERS AND GOODS
Filed Dec. 1, 1965  12 Sheets-Sheet 4
FIG. 19.
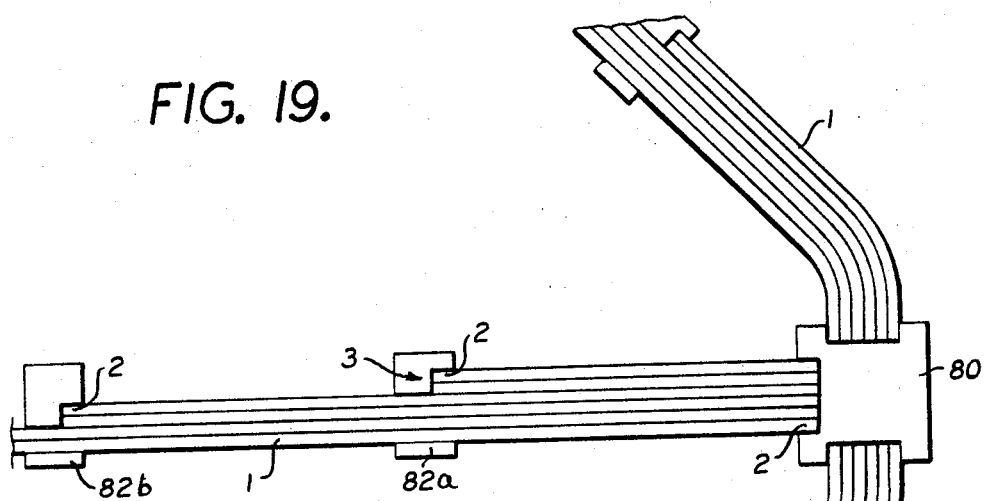
FIG. 20.
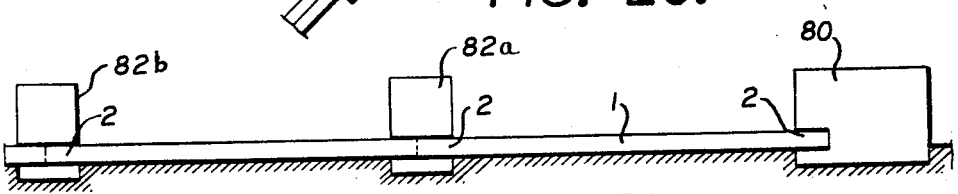
FIG. 21.
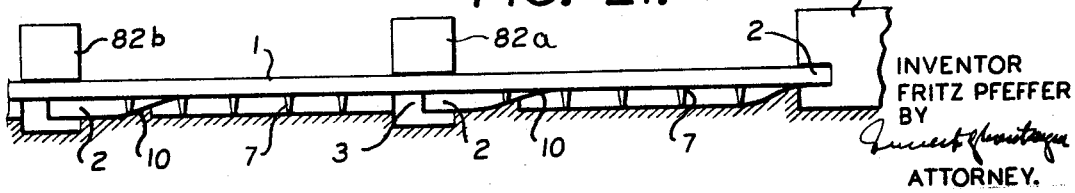
INVENTOR
FRITZ PFEFFER
BY
ATTORNEY.

Aug. 20, 1968  F. PFEFFER  3,397,649
TRANSPORT SYSTEM FOR PASSENGERS AND GOODS
Filed Dec. 1, 1965  12 Sheets-Sheet 6

INVENTOR.
FRITZ PFEFFER
BY
ATTORNEY.

Aug. 20, 1968     F. PFEFFER     3,397,649

TRANSPORT SYSTEM FOR PASSENGERS AND GOODS

Filed Dec. 1, 1965     12 Sheets-Sheet 8

INVENTOR.
FRITZ PFEFFER

BY *Ernest R. Montague*

ATTORNEY.

INVENTOR
FRITZ PFEFFER
BY
ATTORNEY.

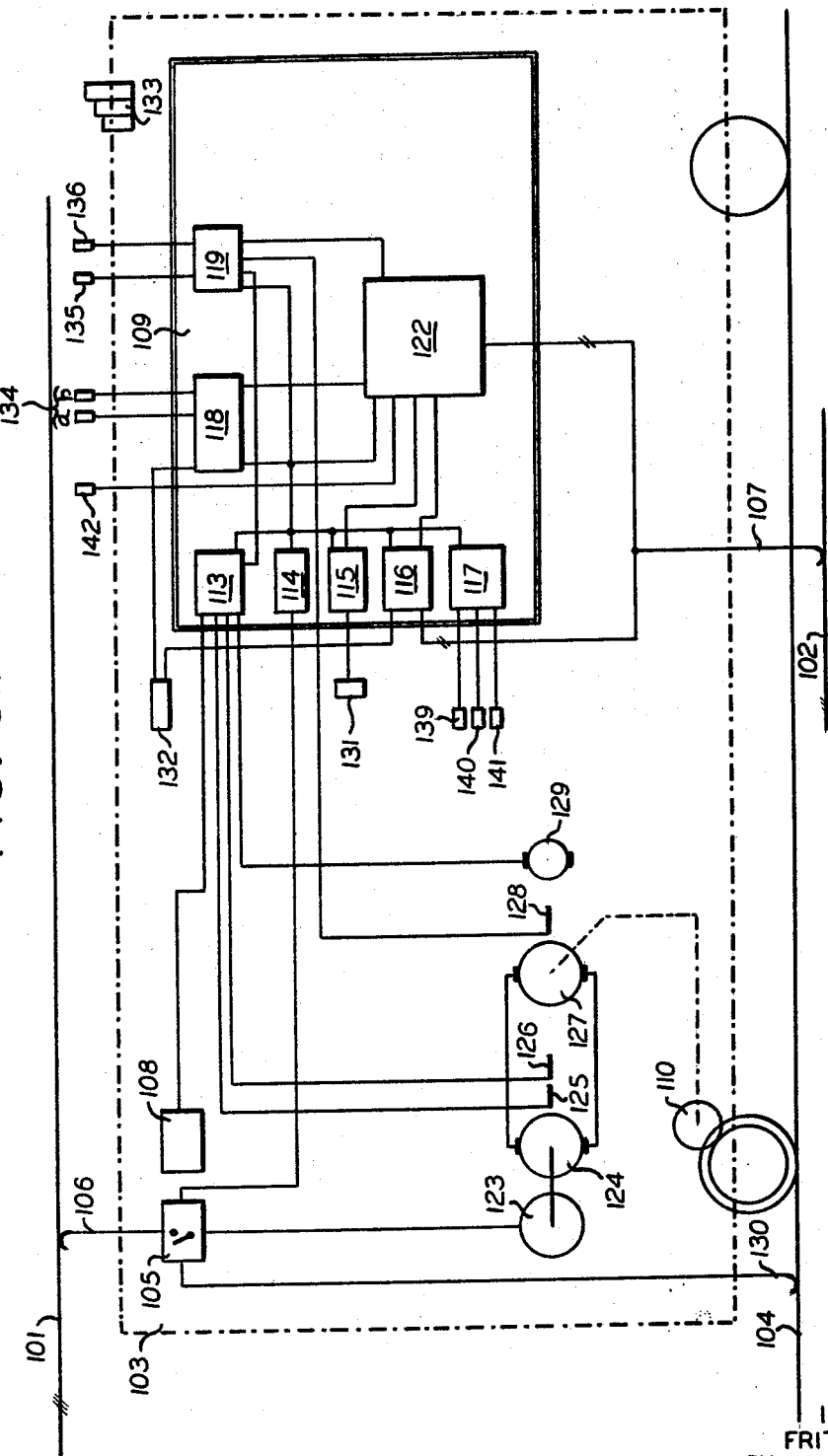

United States Patent Office 3,397,649
Patented Aug. 20, 1968

3,397,649
TRANSPORT SYSTEM FOR PASSENGERS
AND GOODS
Fritz Pfeffer, Renngasse 6, Vienna, Austria
Filed Dec. 1, 1965, Ser. No. 510,569
Claims priority, application Austria, Dec. 2, 1964,
A 10,219/64; Feb. 4, 1965, A 975/65; Apr. 7,
1965, A 3,155/65
12 Claims. (Cl. 104—28)

ABSTRACT OF THE DISCLOSURE

A transport system for passengers and goods to be moved in a substantially horizontal direction comprising at least two spaced apart stations, at least two substantially horizontal track means disposed substantially parallel to one another between at least the two spaced apart stations, at least one vehicle means movable independently along each of the track means, and including means for driving each of the vehicle means and control means for initiating, terminating and correlating the driving means and operations of the vehicle means on each of the substantially horizontal track means. A block means is provided at each station for permitting entrance to and exit from, respectively, each of the vehicle means on each track means, and each of the block means extends transversely across the at least two substantially horizontal track means. Access and discharge means for passengers are provided comprising a bank of adjacent doors in each of the block means, which doors are substantially aligned transversely to the direction of the track means, and each door associated independently with one of the track means for use with vehicles on that track.

---

The present invention relates to a transport system for passengers and/or goods having at least one track connecting several stations and extending in substantially horizontal direction for at least one conveying means or vehicle, for example, a car rolling or sliding along the track and serving for the transportation of passengers and/or luggage, packages or goods.

Some transport systems for passengers and goods have become known in numerous variants, and such systems and installations have been proposed for, among others, warehouses, department stores, office buildings, railroad stations, shops and the like.

It is one object of the present invention to provide a transport system for passengers and/or goods to be moved substantially horizontally with any one of the above-mentioned applications, and more particularly in an application for airports or the like.

The movement of passengers who are about to board airplanes is particularly difficult and presents numerous problems, since it involves, first of all, that these passengers expect personal treatment or reception, while on the other hand, owing to the particular conditions prevailing at and the overall arrangement of airports, as well as their installations, it is sometimes difficult to consider and to satisfy these varying and manifold requirements and accommodations.

It is another object of the present invention to provide a transport system for passengers and/or goods, which includes means for emitting control pulses which regulate and control any predetermined operation and movement of individual conveying means along the assigned tracks.

It is still another object of the present invention to provide a transport system for passengers and/or goods, which includes means permitting the passengers to call individually for a vehicle and operate the same at will, whenever they wish to be conveyed from one station to another station within the transport system, as, for instance, from the main portion of an airport terminal building to any predetermined gate disposed in a wing portion of the terminal building, whereby conventional means may be used in order to bring about such operation.

If the individual conveying means or vehicles are given a sufficiently large capacity, there will be no need for a high number of such vehicles, provided a control system is designed such that a call originating from one of the stations causes response from the closest vehicle or one which already moves in the desired direction toward this one of the stations which originates the call. It is, of course, possible for other passengers to board the same vehicle at intermediate stations, through which the same vehicle pauses, as long as the passengers have in turn released control pulses for stopping the same vehicle in such intermediate stations.

The capacity of a transport system controlled in such manner is rather great and permits compliance with transport requirements with a relatively small number of substantially parallel running tracks and a correspondingly small number of vehices moving therealong.

The arrangement and constructional details of the control equipment for the passenger transport system according to the present invention may be similar in some respects to the control circuits and installations of modern elevator installations having a plurality of vertically moving cars forming a bank. It is known that in such installations it will suffice to give a signal identifying the desired direction of transportation and the destination; the control operation itself, depending upon the signal impulse, takes place fully automatically, insofar as the control system almost "thinks," while searching and selecting the most rational solution for the transportation of the "calling" person relative to the location of the "calling" person, with the most suitable transportation means along the shortest route.

The passenger transport system, forming the subject matter of the present invention, is controlled in a somewhat similar manner, there being, however, the basic difference between the present invention and the known elevator installations, that the tracks run substantially horizontally and that the individual stations are not in adjacent relationship, but are separated by varying, sometimes substantial distances, but in operative connection, by means of the substantially horizontal tracks.

It is another object of the present invention to provide a transport system for passengers and goods, which includes several tracks for the vehicles in parallel and substantially adjacent relationship, so as to achieve the necessary capacity of the transport system. It was hitherto particularly difficult to transport passengers to airplanes because, for safety reasons, transportation above ground could be arranged only to a limited degree and mainly in the form of scheduled group transportation. Sometimes very complicated and time-consuming by-paths had to be used for moving the passengers from the terminal building to the very location of the individual airplanes, namely to the respective gates, where the airplanes were stationed for receiving the passengers prior to departure.

The tracks according to the present invention are easily arranged within the overall plan of an airport or the like.

With the view to avoid any interference with the embarking and disembarking stations in the region of the airplanes, the tracks according to the present invention are preferably provided underground or along paths disposed above ground, at least in those regions which cross with airplane runways.

In order to move the passengers from the underground installation of the tracks to the upper level of the individual station, and back again, means are provided for moving the passengers and/or goods to the upper level either by lifting the entire vehicle or at least a portion thereof, so as to allow entering and leaving of passengers at the stations.

It is still another object of the present invention to provide a transport system for passengers and/or goods, wherein the raising or lifting devices may form part of the station equipment; or, they may be installed in the conveying means or vehicle itself.

It is yet a further object of the present invention to provide a transport system for passengers and/or goods, wherein at the stations of the transport system, including those of the terminal building and respective ones at satellites or substations, are provided entering and exit positions, so that the boarding and alighting places of the separate, parallel and adjoining tracks form a bank substantially transverse to the direction of the tracks. The entrances or doors of the vehicles and the surrounding stationary structures may be provided on one or both ends of the vehicles or alternately on the sides.

In the former case, the bank of approaches or entrances comprises a number of doors in a closed, unitary block, arranged in a single row, somewhat in the manner of large elevator installations. The bank or block is preferably arranged in a central region of the station which may have a generally circular or polygonal arrangement, providing thus full accessibility without presenting any disturbance to other operations.

In the latter case, the entrances of adjoining parallel tracks can be provided, so that they are offset with respect to each other, these entrances being preferably provided on at least one side of the block in the areas accessible owing to the offset arrangement.

If the horizontal passenger transport system according to the present invention is installed at an airport, the tracks for the vehicle, if necessary grouped in several channels running in different directions, will connect a central processing or handling building with a plurality of satellite-like stations. The passengers can reach the plane to be boarded from the terminal building by making use of the inventive system of the present invention, without the necessity of any other means of transportation. Preferably, the satellite stations are surrounded by airplane embarking and disembarking positions or gates and they must, therefore, be within reasonable and substantially uniform distances between the individual satellites or substations.

The terminal building may be connected with a railway station, parking lot, or parking garage building, or the like, by an additional channel of one or more tracks, according to the present invention. The passengers arriving by private or public vehicle, railways or other conveyances can thus reach the terminal building without loss of time and difficulty.

The terminal building with which the transport system of the present invention is associated may have an optional set-up; however, it is advisable to provide the groups or banks of entrances of the individual track channels substantially within a central portion of the building.

It is still a further object of the present invention to provide a transport system for passengers and/or goods, wherein the entrances to the transport channels are arranged at a level below, rather than above, the tracks along which the vehicles are moved. If, for instance, the individual station has the boarding and alighting positions on a large-scale parking lot, it is sometimes more economical and more advantageous to provide the tracks for the conveying means at an elevated level, rather than underground.

It is, therefore, another important object of the present invention to provide a transport system for passengers and/or goods, wherein means associated with at least certain stations for the lowering of the conveying means, or part thereof, from the track to a lower level at which a bank of entrance and exit doors are arranged.

It will be understood that the transport system of the present invention can be realized in numerous different ways. For example, the track or tracks for the conveying means or vehicles may be built at an elevated level, supported by appropriate structures; at the individual stations the vehicles or part thereof can then be lowered to the general transportation level, where the passengers are able to enter and leave the vehicles at the lower level without difficulty.

According to the present invention, the supporting structure can be designed such that it does not impair or even favors normal traffic in the general traffic pattern or the parking of cars. It may even be considered a useful adjunct, since the supporting structure can be shaped as a roof or as a garage structure, or some similar building.

It is, however, entirely possible to provide the track or tracks at the level of general transportation, while the stations are then provided such that the vehicles or part thereof can be lowered to an underground level below the regular transportation level so as to allow the passengers to enter and leave these vehicles at the lower level. This modification is considered advantageous, whenever the entrance and exit positions of adjoining tracks are united into a block or bank disposed transversely to the direction of the tracks, whereby the doors or entrances are preferably provided such as to form a continuous row of such doors on the front or end sides of the vehicles.

With the modified set-up as described in the preceding paragraph, the passengers can board and alight the vehicles without disturbance and danger, e.g., from moving cars at the lower level. Conventional transporting means, like for example, escalators, etc., may additionally be provided between the ground level (e.g., parking lot) and the underground level (station of transport system) for transporation from the underground level to the normal level or in opposite direction.

The lower level provided according to the above-described feature of the present invention may also include transfer stations for and between channels of the transport system, rest rooms, shops, etc. for the convenience of the passengers. It is possible and even desirable to provide such stations at points where two or more tracks or channels, including several tracks, intersect at different vertical, underground levels.

It is another object of the present invention to provide a transport system for passengers and/or goods, wherein the satellite stations with their access entrances may be provided such that the passengers do not have to cross neighboring tracks when entering or leaving the vehicles. The present invention provides a modified arrangement in which certain tracks terminate at the stations to which they are assigned. Thus, the front side of the vehicle, opposite the direction from where the track runs into the station, is fully accessible, at least in the terminal station of the particular track.

According to the present invention, a predetermined number of tracks are assigned in this modification to each station from among a plurality of parallel tracks of the same channel. Several tracks assigned to the same station are formed to a group in a station block, so that the entrances to the vehicles, moving along the respective tracks, are clearly arranged in adjacent relationship. The passengers will, thus, easily locate and reach the particular conveying means assigned for their passage, if located in its terminal station, regardless on which track the vehicle arrives.

This novel concept does not necessarily require to arrange the stations at a level other than that of the tracks. Nevertheless, it may be advantageous to provide the tracks, at least within the range of the stations, at a level different from the normal track level. The raising devices mentioned earlier are not necessary for bringing the conveying means or part thereof to the other level; it is instead possible, according to another important feature of the present invention, that the station disposed at another level can be connected with the remaining track sections by way of a ramp.

An important consideration for the last-described modification of the passenger transport system of the present invention is only, that there be a level difference between the boarding station and the rest of the track or tracks. It is of secondary importance at which level the station and/or the track properly is located with respect to the surrounding area. Under circumstances it may be advantageous to provide the stations at a lower level than the rest of the tracks. The stations, with their access doors in the banks could, for example, be arranged at ground level, while the tracks run along elevated structures.

It will be understood that the above-described features and possible realizations of the transport system of the present invention may be combined according to local and operational requirements. The embodiment to be described hereunder will be given solely for illustrative purposes, the features and expedients of which may be combined and used simultaneously, even if not specifically described and illustrated herein.

With these and other objects in view, which will become apparent in the following detailed description, the present invention will be clearly understood in connection with the accompanying drawings, in which:

FIGURE 1 is a schematic plan view of a preferred, basic set-up of the horizontal passenger transport system according to the present invention, illustrating an exemplary station arrangement for an airport;

FIG. 2 is a side elevation of the system disclosed in FIG. 1;

FIG. 3 is a schematic vertical section through one of the stations;

FIG. 4 is one possible embodiment of the raising and lowering means for the vehicle, showing a stationary lifting device at the bottom of the station;

FIG. 5 is a view similar to FIG. 4, wherein the raising means is part of the vehicle, for moving at least a section thereof with respect to an under-carriage;

FIG. 6 is yet another embodiment, wherein the raising means of the vehicle rests, in its raised condition, on the bottom of a station;

FIG. 7 is a reversal of the structure shown in FIG. 5, the raising means forming part of the movable vehicle;

FIG. 8 is a schematic top plan view of a block-type station with banks of access entrances, one pair of which is shown open;

FIG. 9 is a view similar to that of FIG. 8, but of an arrangement wherein the stations of adjacent tracks are lengthwise offset with respect to each other, one lateral door being shown in its open position;

FIG. 10 is an illustration of terminal loops for several parallel tracks;

FIG. 11 illustrates how the vehicles can be transferred from one track to the other at a terminal station;

FIG. 12 illustrates a storage space at the ends of several tracks for reserve vehicles which can be used during peak-load periods but left otherwise inoperative;

FIG. 19 is a schematic top plan view of the inventive transport system disclosing still another embodiment, wherein some of the tracks terminate at stations to which they are allocated;

FIG. 20 is a schematic side elevation, partly in section, corresponding to a portion of FIG. 19;

FIG. 21 shows a side elevation of another modified arrangement preferred in connection with the disclosure of FIG. 19, in a view similar to that of FIG. 20;

FIGS. 28-31 disclose by example circuit means for operating the vehicles in the scope of the present transport system.

Figure 13:
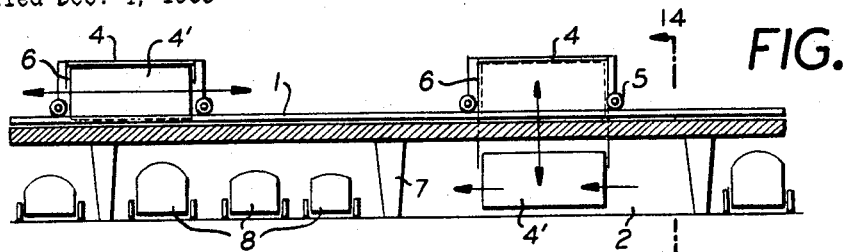
FIG. 13 illustrates a side elevation of an elevated track on a supporting structure, the space thereunder serving as a station and also for other purposes (e.g., for parking cars)

Referring now to the drawings, and in particular to FIGS. 1 and 2, the basic arrangement of the transport system comprises a centralized building, for example, an airport terminal 80, connected with another building 81, e.g. a parking lot or garage, by way of tracks 1, which have stations 2 shown at both locations. The terminal building 80 has similar tracks 1 running in various directions to satellites or substations 82, 83, 84a, 84b, 84c, 85a, 85b and 86, respectively. It will be understood as the specification proceeds, that the track lines 1 are schematic and actually represent transportation channels within which one track or a plurality of adjacent tracks may be provided, for example as shown in FIGS. 8, 9 or 19, etc.

The tracks 1 branch radially from the centrally located terminal building 80; their lengths are determined by local considerations. All substations include embarking stations 2, as shown; these are also illustrated, for example, in FIGS. 3–7. As will be readily appreciated from FIGS. 1 and 2, passengers arriving with any of the airplanes 90 may proceed to the satellite or substation closest to them from where they can board the vehicles running along the respective tracks 1, by way of one of the appropriate stations 2.

FIG. 2 shows that the tracks are provided underground, that means at a lower level. The vertical arrows shown in FIG. 2 indicate that the conveying means or vehicles (not shown) can be raised and lowered, respectively, from the track level to the station level, provided within the respective buildnigs at ground level and be used to move the passengers from the substation 82 to the terminal building 80 and the other way. The movement of the individual conveying means in the tracks coordinated thereto is controlled in dependency upon impulses delivered at the individual stations.

FIG. 3 schematically illustrates a vehicle 4 having wheels 5 for moving along an underground tunnel or track 1 in either direction, as indicated by the horizontal arrows. The driving means for these vehicles being conventional, it is neither described nor illustrated herein. The station 2 is, above the track 1, and is formed like a cabin. By means not shown in FIG. 3, the vehicle 4 (or a part thereof) can be raised, as indicated by the vertical arrows, to the upper level within the cabin (shown in broken lines). When the doors of the vehicle open, the passengers may board or alight, as the case may be; hereafter the vehicle or its portion is lowered again to the track 1, whereupon it can continue its path to the next substation or to the terminal.

Referring now again to the drawings, and in particular to FIGS. 4–7, examples are given for the lifting mechanism which may be associated either with the immovable station or with the movable vehicle. An arrangement is shown in FIG. 4, where a lifting device 6 is built into the floor of the station 2 for moving the vehicle 4, e.g., by hydraulic or other means, to the upper level of the station. It will be understood that this mechanism could also be provided on top of the station 2 instead of at its bottom. The schematic illustration of FIG. 4 is only intended to present a possible mode of carrying out this phase of the invention, by a stationary lifting mechanism associated with the station.

FIGS. 5–7 show an alternative means, in which the lifting mechanism forms part of the moving vehicle 4. In FIG. 5, the undercarriage or lower part of the vehicle 4 has thereon a raising mechanism 6′ for moving the upper portion 4′ of the vehicle.

FIG. 6 shows an alternative embodiment where the vehicle 4 has a downwardly directed mechanism 6″ acting, for example, by hydraulic means for raising the entire vehicle from the lower track level to the upper station level, as shown in broken and solid lines, respectively.

Finally, FIG. 7 represents a variant of the structure shown in FIG. 5 wherein a lifting mechanism 6‴ is attached to the movable portion 4′ of the vehicle for strutting against the undercarriage 4 during the lifting movement. In both embodiments of FIGS. 5 and 7, the undercarriage remains on the track and only part of the vehicle is moved up and down; in FIG. 6 the entire vehicle is raised. In FIGS. 4 and 7, the arrows indicate the lifting movement and in FIGS. 5 and 6, the arrows indicate the lowering movement.

It will be understood that the actuating means, safety devices and other necessary parts of the vehicle 4, its moving portions 4a, or any of the lifting mechanisms 6–6‴, etc. have not been shown in detail because they do not alone form part of the present invention. Similarly, the doors provided in both the vehicles and the stations have been omitted from FIGS. 3–7 for clarity of presentation.

Figure 22:
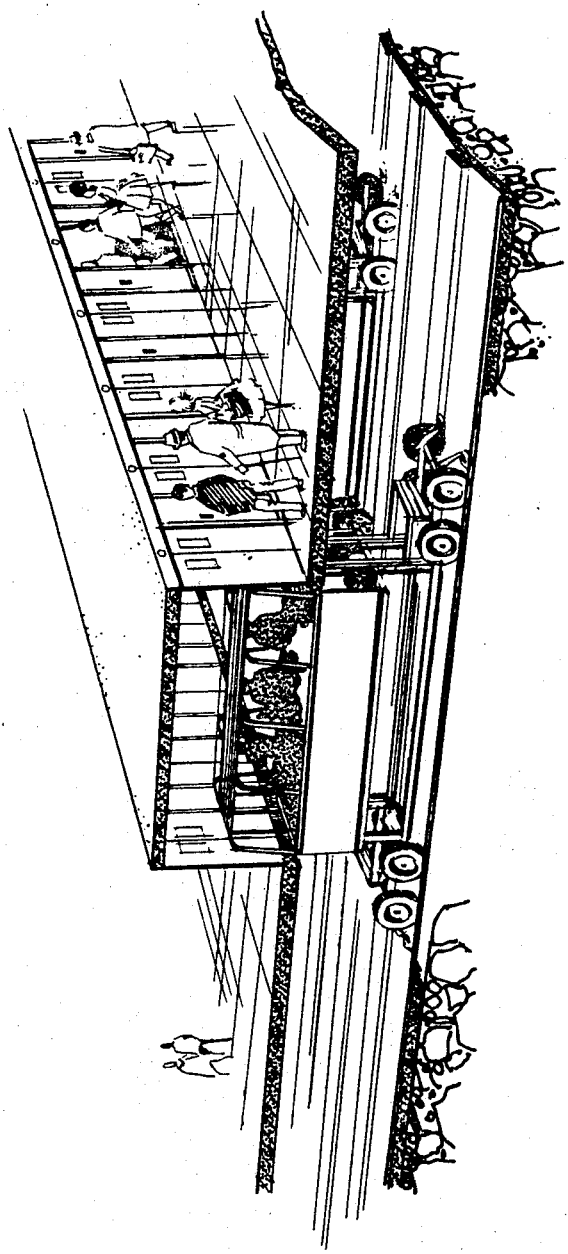
FIGS. 22, 23 and 24 are schematic perspective views indicating the three different systems, namely the tracks being lower than the door banks, the tracks being on the level of the door banks, and the tracks being higher than the door banks.
Figure 23:
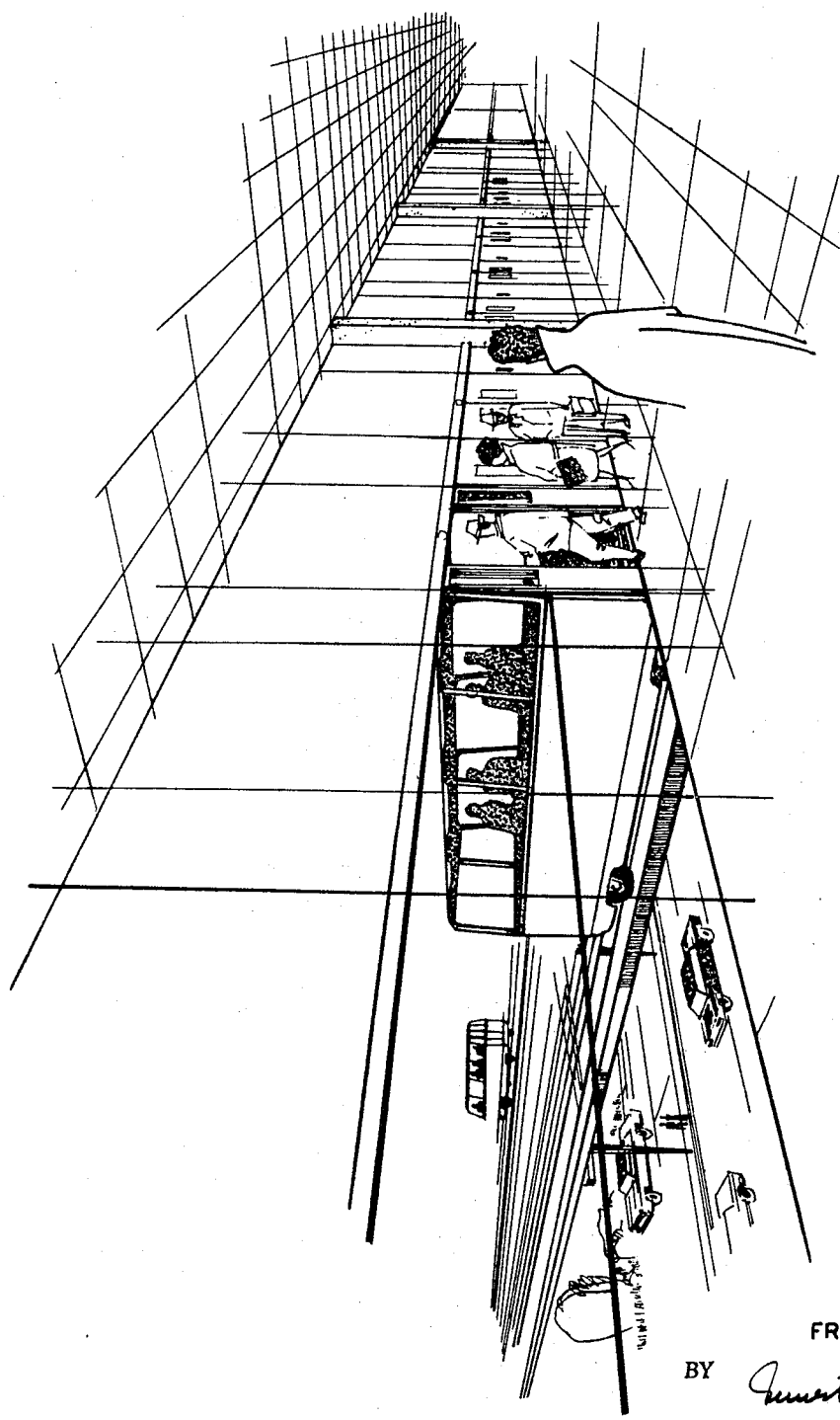
Figure 24:
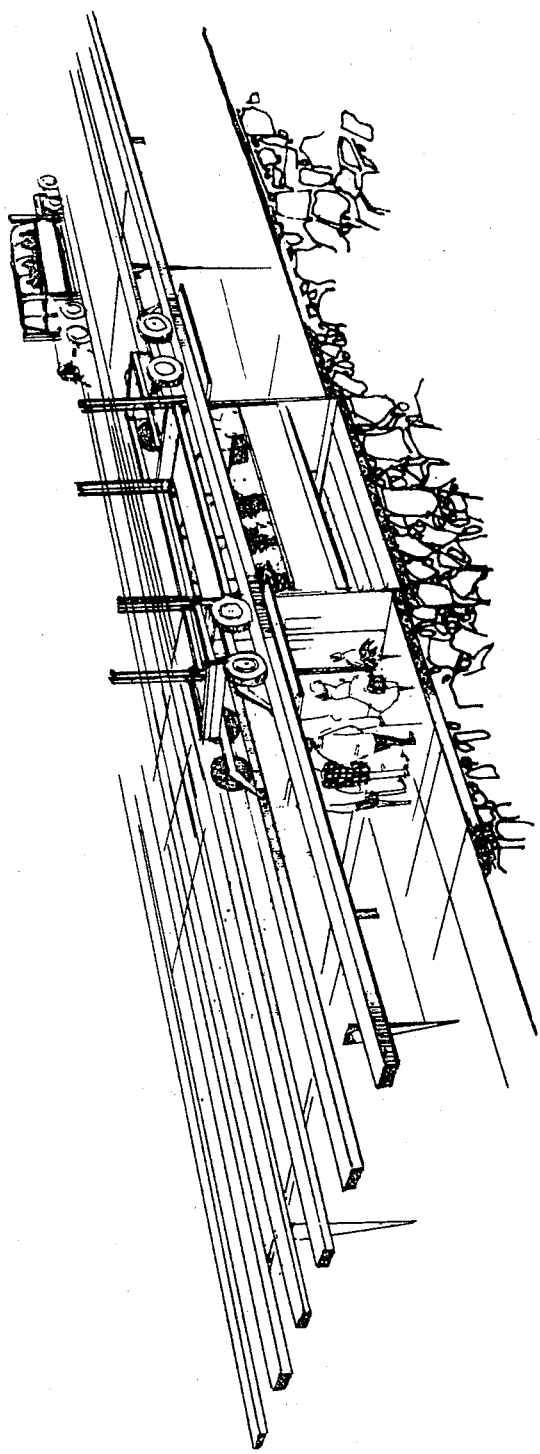

Referring now again to the drawings, and more particularly to FIGS. 8 and 8, there are disclosed two different arrangements for the entrance and exit positions which are combined into a station. In FIG. 8, all these entrance and exit stations 2 with appropriate entrance and exit doors 3 form a closed block 2′ disposed transversely or crosswise to the direction of the tracks 1. As shown in FIG. 8, the doors 3 are at opposite end faces of the block, so that they are easily accessible to the waiting passengers. Also note the perspective view of these station blocks with the exit and entrance doors adjacent one another, respectively, forming a bank of doors of FIG. 22.

Next to these doors, electric push buttons or other signal means are provided whereby the passengers are given the opportunity to send an impulse to a centralized control system. Appropriate luminous or acoustic signals may be provided in conventional manner to inform the passenger on which track and at which door he may expect to board the approaching vehicle. It will be found advantageous to designate the door on one side as an entrance and that on the other side as an exit, so as to assure continuous flow of passenger movement.

Whenever it is necessary for some reason to provide the entrances on the lateral sides of the vehicles, an arrangement as disclosed in FIG. 9 is suitable. This may be the case if the transport system of the present invention is used additionally in connection with regular stations having platforms, whereby the access space is somewhat limited. In this arrangement, the entrance and exit positions are longitudinally offset, so as to form a block 2″, leaving parts of the sides of the stations partly exposed for the arrangement of lateral doors 3, as soon as these vehicles are lifted to the higher level.

As mentioned before, the vehicles 4 can be driven by any conventional means. Preferably, they have self-contained electric drives deriving the necessary electric energy from third rails placed alongside the tracks 1. These being, again, known expedients, no further details will be required for the understanding of the present invention.

Mechanical driving means are, of course, entirely feasible, such as an endless chain or rope drive, provided along the track, so that each of the vehicles can engage the same for being entrained thereby. The mechanical driving means also lends itself to automatic operation in conjunction with the above-mentioned control system.

The guidance and design of the conveying means (vehicles) 4 can be freely selected within the scope of the present invention; the illustrated wheels 5 merely indicate a possible, schematic rolling means whereby to convey a vehicle along a track. The mode of operation of the conveying means of the present invention can be selected freely and organized. FIGS. 10 to 12 present merely several possibilities without limiting the present invention thereto.

Referring now again to the drawings, and in particular to FIG. 10, the common ends of a plurality of substantially parallel tracks 1 are shown terminating into loops so as to return the vehicles from one track to their path on another track in a simple manner. In a known manner, a loop may also be added to a single track (not illustrated) which serves for the movement of the vehicles in both directions, preferably, if a single vehicle is used.

If more vehicles move along the same track, it is preferred to operate the tracks in an unidirectional manner, as indicated with the arrows shown in FIG. 10. As a matter of example, three track loops are provided which form six adjacent parallel tracks in the range of each station.

In FIG. 11 means are provided for moving the vehicles 4 from one track 1 to the other, without the provision of loops. Such means are schematically shown at 1′ and follow basically the solution of FIG. 10 and can be operated as stated above. The vehicles 4 retain their position thereby continuously in the moving system, which can be desirable under circumstances due to the station and conveying arrangements.

Finally, FIG. 12 discloses a system, wherein the tracks 1 are not connected relative to each other, so as to provide two-directional movement for the vehicles 4. Reserve track sections or a reserve yard 87 may be provided for a plurality of spare vehicles at the ends of the tracks, e.g. during low-traffic, and to be used only during a heavier demand on traffic.

If more than one vehicle is operated on individual tracks 1, electrical or mechanical block sections may be necessary, as indicated by letters A and B. This expedient, well known from railway or electric subway operation, need not be elaborated upon. The same may be applied to the variant of FIG. 10, wherein it is also possible to run several vehicles 4 on each of the tracks 1. The block sections of other appropriate safety measures will prevent the vehicles from colliding with each other. Should, during weak or standby periods only one vehicle be operated on a track, the safety installation and the block sections may, of course, be rendered inoperative.

Referring now again to the drawings, and in particular to FIG. 13, an arrangement is disclosed, according to which a plurality of tracks 1 of the transport system are at an elevated level, rather than underground. The access and exit positions 2 are at ground level. The vehicles comprise a moving portion 4 with wheels 5 and the like, as well as a portion 4′ that can be lowered and lifted again to the track level. The device 6 for lifting and lowering, respectively, described before, is only schematically shown and may have any practical embodiments. The supporting structure 7 provided for the tracks 1 above the normal transportation level is designed such that underneath the structure, useful space remains at ground level, for example, for parking vehicles 8 between the posts of the supporting structure. The structure 7 provides the roof for such cars and also for the traffic at ground level.

Upon lowering the portion 4' of the conveying means (as indicated by the vertical arrows in FIGS. 13 and 14), the passengers may leave or alternately enter the vehicles through doors which are preferably provided on the front end or rear end sides, that is, in the direction of the tracks 1. The boarding and alighting directions are shown in two possible variants in FIG. 15.

Figure 14:
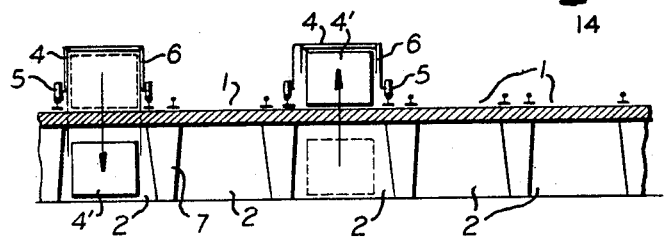
FIG. 14 is a section along the lines 14—14 of FIG. 13, showing two passenger stations of a transport channel having several tracks, one vehicle being lowered and the other raised.
Figure 15:
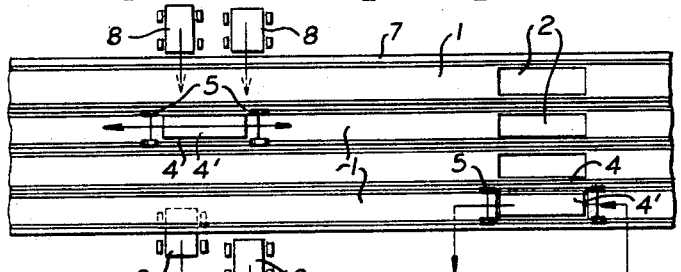
FIG. 15 is a top plan view of the arrangement shown in FIGS. 13 and 14.
Figure 16:
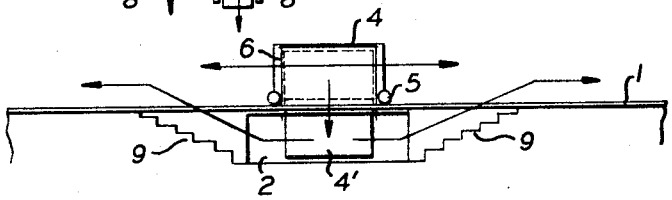
FIG. 16 is a side elevation of another embodiment, wherein, as a matter of example, stairs are provided between the upper track level and the lower station or access level.
Figure 17:
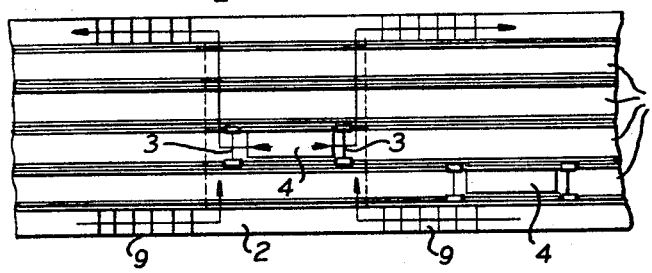
FIG. 17 is a top plan view of a station arrangement of the inventive transport system, with plural stairs or escalators associated with a boarding and alighting station, serving several parallel tracks.
Figure 18:
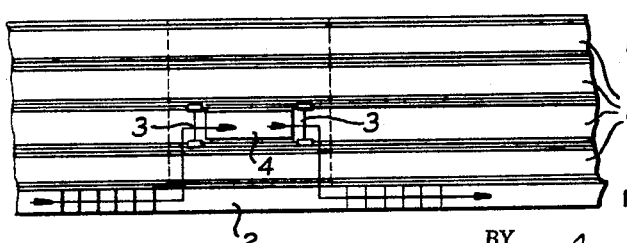
FIG. 18 is a top plan view similar to that of FIG. 17 but with a different arrangement of the transporting means (e.g., escalators)

A modification of the set-up shown in FIGS. 13–15 appears in FIG. 16. Here, the lowerable part 4 of the conveying means is lowered by means of a lifting and lowering device from the total vehicle 4' together with rollers 5 running on the tracks 1, so that passengers may enter and leave the vehicles in the underground stations 2. These stations 2 are accessible from the level of the tracks 1, in which the tracks 1 are disposed, by means of stairways, ramps, moving stairs, or the like. The access and exiting of the persons to be transported can be as indicated in FIGS. 17 or 18, whereby both end sides of the vehicles are used for entrance and exit or only one end side for entering and the other end side for leaving the vehicle. Stairways can be provided on one or both end sides. The tracks 1, in this embodiment, are at ground level which serves general transportation. Stairs 9 are shown interconnecting the ground level with the underground station level; these are representative of any known type of transporting means between spaced-apart levels, e.g., ramps, escalators, and the like.

FIGS. 17 and 18 are alternate examples of passenger access and discharge, wherein doors 3 are again provided in the direction of the tracks. Preferably, one end of the vehicle should be used for boarding and the other for alighting. Accordingly, the transporting means (escalators) may be arranged in one or in both directions alongside the tracks, as illustrated.

FIGS. 19–21 show another important feature of the present invention according to which a central building, for example a terminal station 80 is connected with satellites or substations 82a and 82b, as well as 83a and 83b, etc. by way of plurality of parallel tracks 1 disposed adjacent each other and forming transportation channels. Access and discharge means 2 (entrances for vehicles) are again provided, as can be clearly seen in FIG. 19, some of the tracks terminate at intermediate stations and do not run along the entire channel. Once the vehicles have arrived at the access and discharge stations 2 of the tracks terminating at the particular station, the passengers may use the doors 3 which are arranged on the front side of the vehicles, in the direction of the tracks, so that the adjoining tracks do not have to be crossed by these passengers. At the stations, the access and discharge means for both the terminating and the continuous tracks 1, which may end at the next station, may be formed into blocks or banks. It is, of course, also possible to arrange the doors on the front side of the vehicles for the terminating tracks and on the lateral sides thereof for the through-running tracks, provided the vehicles themselves are equipped with selectively operable sets of doors at both locations.

A lateral sectional view (FIG. 20), somewhat similar to that of FIG. 2, shows that the boarding and alighting conveniences 2 may be at the same level as that of the tracks. The presence of the through-running tracks 1 on one side of the terminating tracks may hinder the access to the vehicles in the stations. For this reason, an arrangement according to FIG. 21 may be used, wherein the tracks 1 are mounted at an elevated level, somewhat like that shown in FIG. 13. A suitable supporting structure 7 is, for example, provided with pillars or posts. Those tracks which terminate at a given station, may have terminal portions made to slant to the ground level, for example by way of ramps 10, as illustrated.

The same arrangement could also be used for tracks running at ground level, with upwardly directed ramps leading to elevated stations or discharge conveniences. Also, it is entirely feasible to provide ramps for the through-running tracks, as well, or for the latter alone. Local service conditions, distances between the substations, characteristics of the terrain, and other factors may decide which modification of the inventive horizontal passenger transport system should be adapted. In FIGS. 19–21 it is a special advantage that the raising and lowering means for the vehicles or portions thereof can be dispensed with, maintaining at the same time the advantages of two-level operation with tracks on one level and embarking or access means on the other.

While the present specification and the examples given therein are directed primarily to airport traffic, it will be understood that this has been given by way of example only, and that the transport system lends itself to other applications, like fair grounds, amusement parks, sports grounds, and the like.

It is to be understood that the lifting and lowering means of at least part of the vehicle can be of any conventional structure and can be mechanically, hydraulically or electrically operated.

Figure 25:
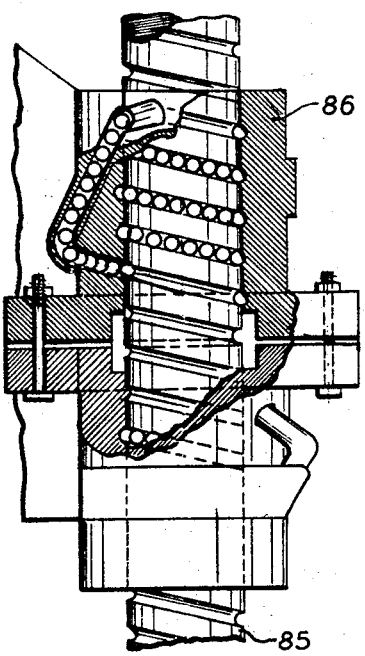
FIG. 25 is an elevation, partly in section, of one embodiment of the lifting means.
Figure 26:
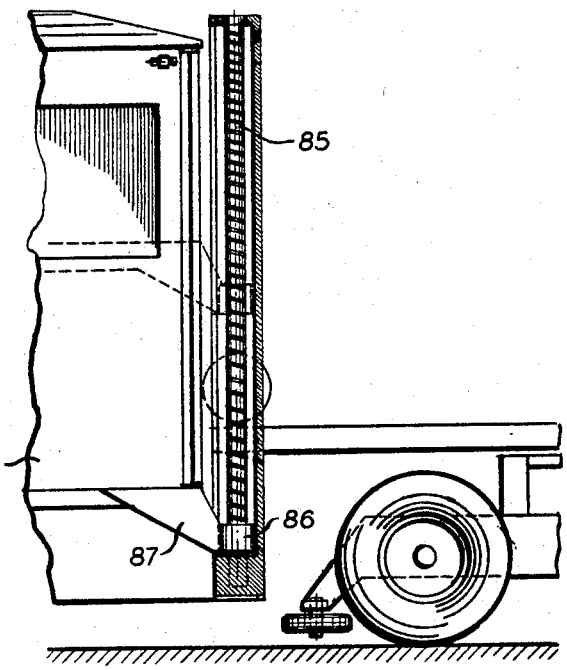
FIG. 26 is a fragmentary elevation of the lifting means disclosed in FIG. 25.

Referring to FIGS. 25 and 26, a rotating vertical rod 85 is provided, which, upon rotation, lifts or lowers a nut member 86 which is rigidly connected by arms 87 with the vehicle housing 88 and thus operates the vertical movement of the latter.

Figure 27:
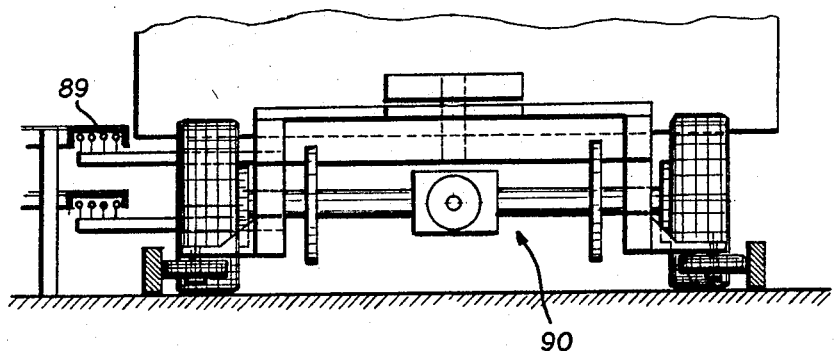
FIG. 27 is a fragmentary elevation of the electric feeding and control means for said vehicle means.
Figure 28:
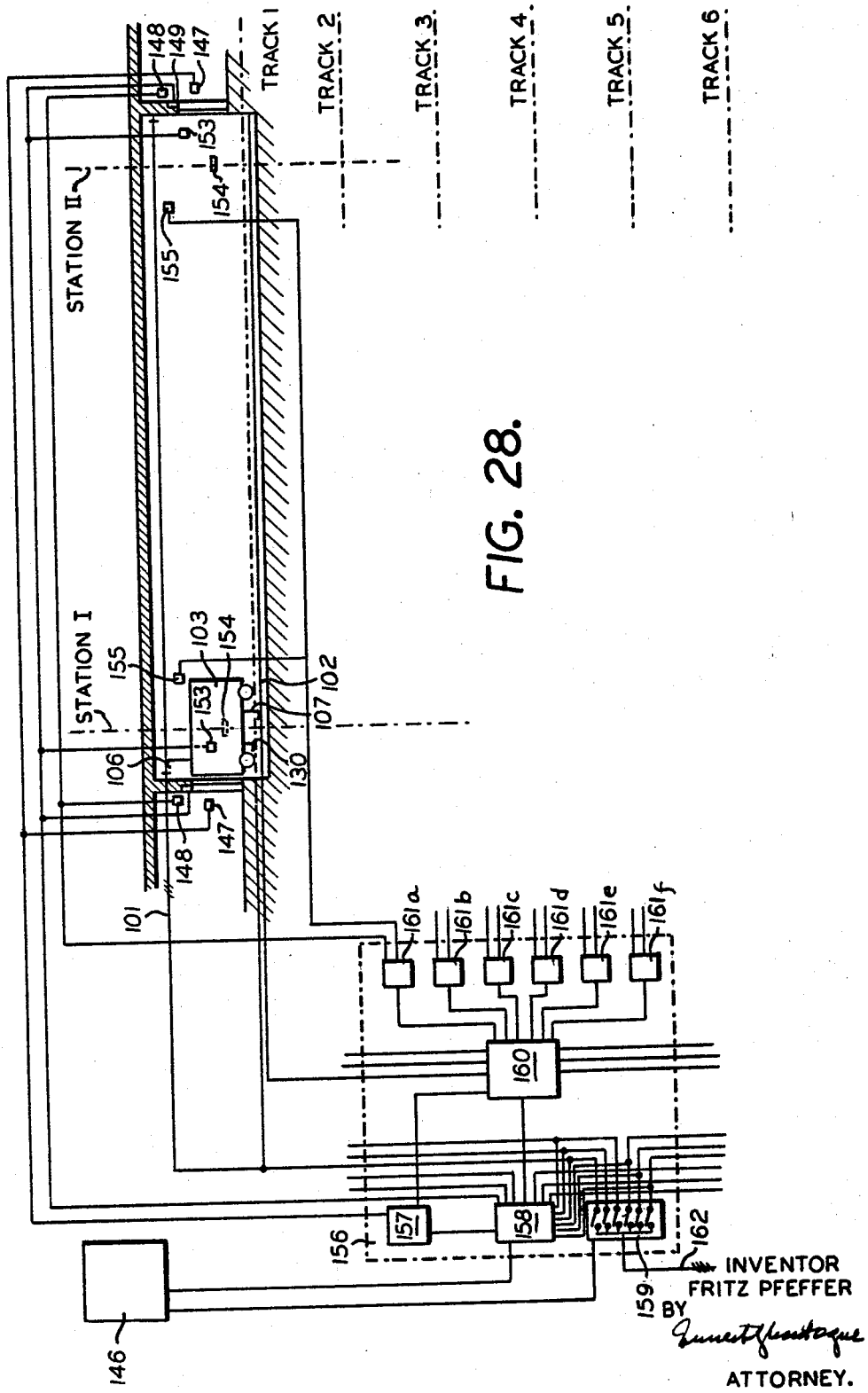

Referring now to FIG. 27, the electric feeding means 89 for the carriage 90 of the vehicle is merely schematically disclosed, since such means do not contribute part of the present invention.

It is further to be understood tha the electrical operational means as the calling of a particular vehicle to any of the stations is not part of the present invention and any conventional elevator circuits can be applied in the same manner as used in connection with elevators.

Merely by example and to contribute to a better understanding of the present invention, FIGS. 28 to 31 disclose such conventional operational circuit.

Referring now to FIGS. 28 to 31, the circuit includes a current feed 162 leading to a distributor 159, which in turn includes conventional switching relays, which are operated by remote control from a command desk 146 and, thereby, control the total energy supply to the individual tracks.

The control current supply for a central control unit 158 originates also from the distributor 159, which central control unit 158 contains in conventional manner all checking-, locking-, control-, program- and safety-relays. The command- or push-button boxes 147 transmit the travel-calls initiated by the travellers according to the direction of travel to the call-storage device 157. The travelling system operates according to the collective-selective-control principle, whereby the calls are responded to in accordance with the desired direction of travel. For this purpose, the intermediate stations II and III are equipped in the push-button boxes 147 with two buttons (not shown), corresponding with the possible directions of travel, and in the push-button boxes 147 of the terminal or end stations only one button (not shown). The call-storage device 157 deceives the commands and feeds the same to the control block 160 for the determination of the direction of travel.

The command for the direction of travel for any vehicle is determined in the control block 160 by means of vehicle-position-indicators 161a, 161b, 161c, 161d, 161e and 161f, which the prevailing position of the vehicles by the impulse-switches 155 and by means of the call-storage device 157.

Figure 29:
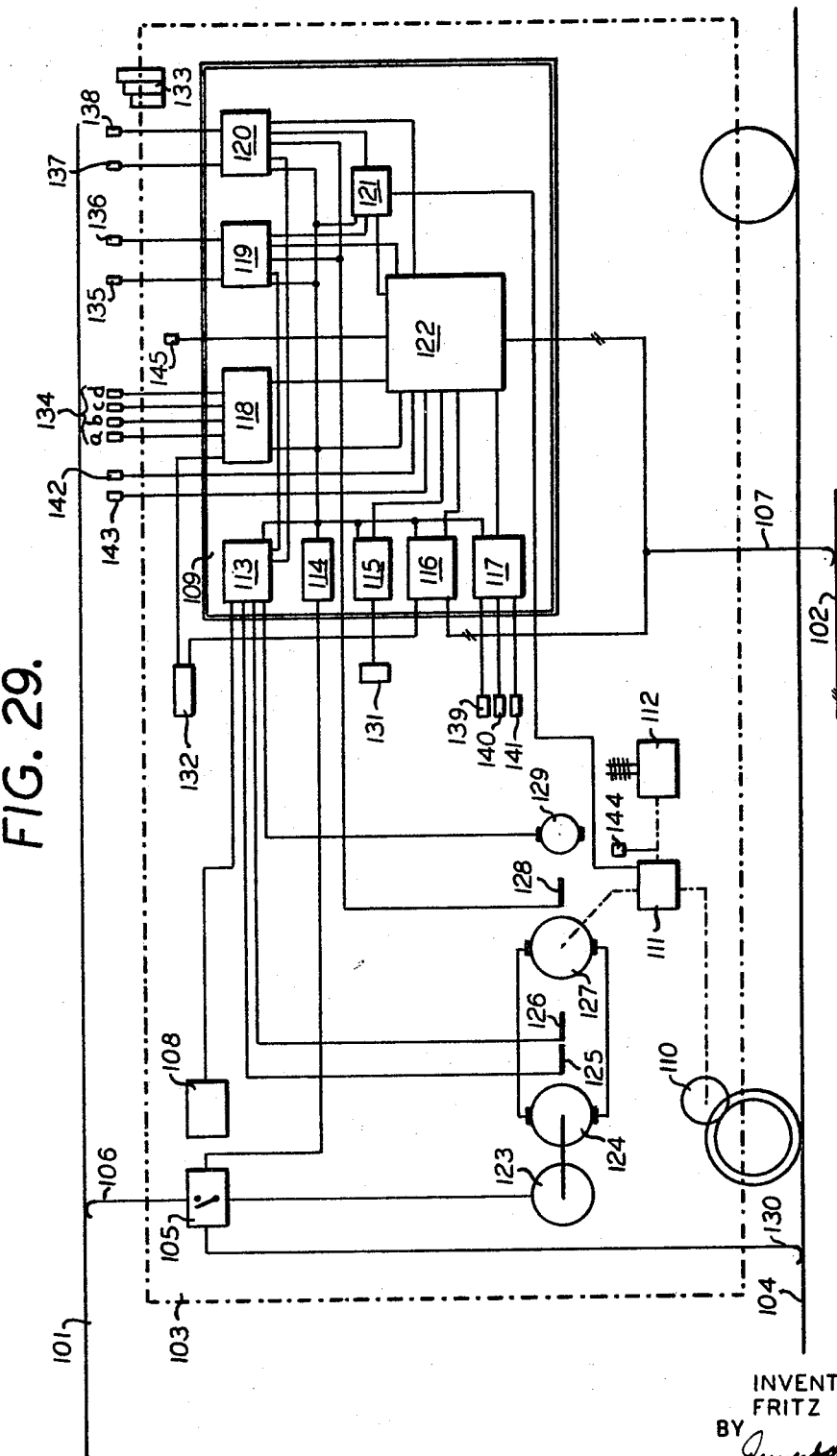
Figure 30:
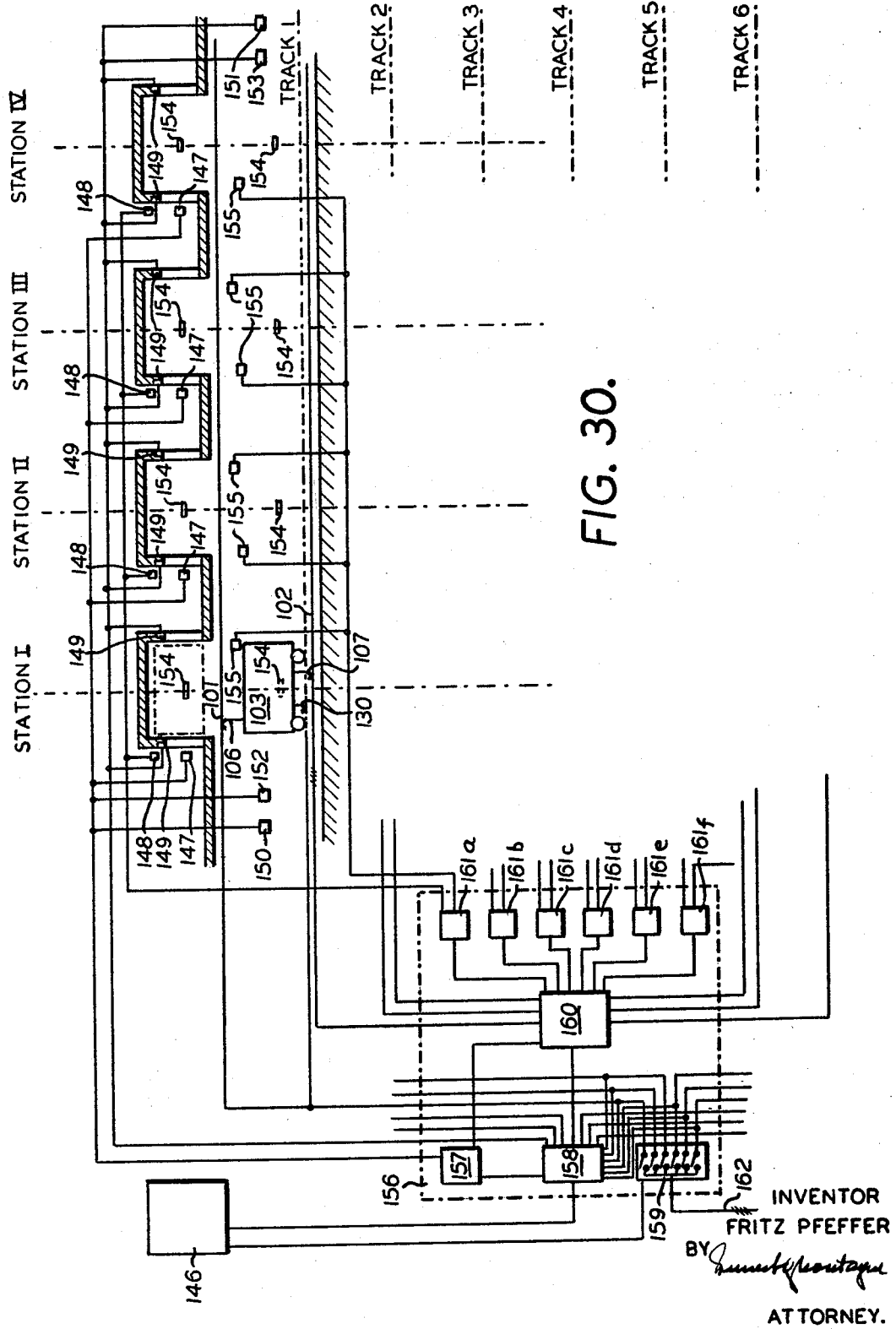

Referring now to FIG. 29, the travelling command is fed by means of the control conduit feed 102 over the current take-up 107 to the B-position 109 of the prevailing vehicle and starts the travel in the desired direction.

The individual power conduits 101 are fed from the distributor 159. Instead of the alternating current asynchronous motor 123, shown by example, it is of course also possible to provide an alternating current-single phase motor, whereby only one power current feed is required. A Ward-Leonard drive 123, 124, 125, 126 and 127 is shown by example for the horizontal and vertical movement of the vehicle, which drive makes possible any desired speed by means of a governor 108 over a pole reverser 113. The main field 125 of the generator 124 is changed thereby and thus the number of revolutions of the motor 127. The direction of the current flow, corresponding with the desired direction of travel, for the fields and the governors, respectively, takes place in the pole reverser 113. The generator 127 provides an electric voltage proportional to the number of revolutions of the motor 127 and indicates with the predetermined assigned voltage the regulating adjustment. An electrically operated clutch 111 connects the motor 127 with the drive 110 for either a horizontal movement or by lifting means 112 a vertical movement of a particular vehicle. A control contact provides for the indication of the clutch position. Means are provided to disengage the vertical drive during the horizontal movement of the vehicle.

Each vehicle 103 includes in addition to the drive, described above, the following control elements:

The electric power is fed from the current take-up 106 to the distributor 105 to the motor 123, but also to current-divider 114 which provides electric energy to all control units. By means of switches 134 the prevailing vehicle position is also indicated in the vehicle by means of the block 118. This is required, in order to operate, on the one hand, the optical position indicator 32 and to transform, on the other hand, the commands given on the push-button box 131 by means of a call-storage box into a definite moving direction in a block 116. The movement command is fed from block 116 over a central control station 122, which contains all auxiliary-, safety- and control-relays to the horizontal movement control 119, the vertical movement control 120 and the clutch control 121, respectively. Door drives 139, light beam controls 140 and locking means 141 are operated by the block 117. Switches 142 and 143 initiate the speed retardation for the horizontal and vertical movement of the vehicle. A contact 145 serves a safety contact, which indicates whether the vehicle has performed a vertical movement and is thus locked for any horizontal movement. The control slide conduit 102 feeds the movement direction command to the vehicle and carries the holding and alarm signal.

Rails 4 are intended as electrical comparison potential and are connected with the distributor 105 by means of a current-up take-up 130. The elements 133 and 154 are designed for the operation of the preferably non-contact switches 135, 136, 137, 138, 142, 143 and 155.

In accordance with the traffic requirements, different travel programs can be stored for a group of vehicles on adjacently disposed tracks, which are followed automatically as long as no other program is stored.

The following programs can be performed in a transport system particularly designed for an airport:

A. Essentially direction of traffic from a station in the main terminal building to the satellites disposed in series relative to each other. The individual vehicles return automatically to the main terminal building upon performance in accordance with the traffic command and stand there awaiting further commands for travel to the satellites. This program will be initiated if essentially departure traffic in the individual satellites is prevalent and the passengers are to be brought from the main terminal building to the planes, which are positioned next to the respective satellites.

B. Essentially direction of traffic from a predetermined satellite to the main terminal building, to be instituted during arrival traffic at such satellite. All vehicles included in the system move to the satellite station, designated as traffic main point, and move after boarding without further stop to the main terminal building.

After performance in accordance with the traffic command, the vehicles return automatically to the satellite. In order to comply also with any traffic commands in the other stations, for instance, one vehicle of the system can respond to the incoming commands from the remaining stations.

C. Unitary traffic flow from the individual satellites to the main terminal building.

In order to assure a unitary service of all satellites of a traffic system, in accordance with this program, the individual vehicles are called back after performance of the prevailing traffic commands to the satellite stations, whereby a predetermined number of vehicles is assigned to each of the satellites.

D. Equalized traffic between the main terminal building the satellite without pronounced traffic direction. In accordance with this program, a vehicle is coordinated to each satellite and the remaining vehicles are coordinated to the main terminal building, in order to have available a vehicle in all stations without appreciable waiting time.

A particular performance of a run of vehicle will now be described:

Upon operation of a push-button for the desired direction of movement in one of the stations, a signal is conveyed to the call-storage device 57. The latter receives the command and feeds it to the control block 160 for the determination of the direction of movement. In this control block 160 the position signals arriving from the impulse senders 155 to the vehicle position indicators 161a to 161f and the traffic command is coordinated to the vehicle located in the most favored traffic position in relation to the calling station and to the direction of movement.

The traffic command is fed by the conduit 102 and the current take-up 107 into the control block 109 of the selected vehicle and starts the travel of this vehicle in the desired direction. The final call coordination to one of the vehicles takes place, however, only shortly prior to entrance of the destination station, whereby a few seconds prior to entrance of the vehicles in the station, for instance, an optical indicator and an acoustic indicator announce the arrival of the vehicle. The direction of movement to be continued can be shown on a light indicator. The stopping of the vehicle in the station, as well as the following vertical movement, if required, in accordance with the used system, which can be a lifting or lowering movement, and also the opening of the doors of the particular bank for receiving the passengers takes place automatically.

The passengers enter the vehicle and operate the destination push-button of one of the two push-button boxes provided in the vehicle, whereupon the doors close in known manner after expiration of a predetermined time interval, and thereafter, if the system requires, the vertical travel and the horizontal travel start; in accordance with one embodiment of the system the vertical travel can be omitted. The position of the vehicle during its travel can be indicated by any suitable indicating means, as by a transparency. In the destination station, the exit door opens preferably a few seconds before the opening of the entrance door. By this arrangement, it is assured that the movement of the passengers leaving and entering the vehicle is performed without any difficulty.

The individual traffic programs are manually set in the given example on the command desk. It is also possible to provide, however, an automatic program feeding operated, for instance, by a clock in dependency upon the traffic pattern of the planes. Another means of automatic program feeding is by providing in each of the vehicles a weight responsive control means. This arrangement has, however, the drawback that a certain measuring time period for changing the program has to pass prior to setting a new program.

The described control means for a traffic system according to the present invention are merely an embodiment which is not subject matter of the present invention.

As set forth above, the vertical movement of the vehicle, either, as a lifting movement or a lowering movement, can be omitted if the stations are on level with the tracks. The blocks of vehicle position control 161a to 161f are simplified thereby to two positions.

While I have disclosed several embodiments of the present invention, it is to be understood that these embodiments are given by example only and not in a limiting sense, the scope of the present invention being determined by the objects and the claims.

I claim:

1. A transport system for passengers and goods to be moved in substantially a horizontal direction, comprising at least two spaced-apart stations,
at least two substantial horizontal track means disposed substantially parallel to one another between at least said two spaced-apart stations,
at least one separate vehicle means movable independently along each of said track means,
means for driving each of said vehicle means,
control means for initiating, terminating and correlating said driving means and operations of said vehicle means on each of said substantially horizontal track means,
a block means at each station for permitting entrance and exit from, respectively, each of said vehicle means,
each of said block means extending transversely across said at least two substantially horizontal track means, and
access and discharge means for passengers comprising a bank of adjacent doors in each of said block means aligned substantially transverse to the direction of said at least two track means.

2. The transport system, as set forth in claim 1, wherein said track means between said stations and at least one of said stations are disposed at different levels, and
lifting means on said vehicle means for raising at said at least one of said stations at least a portion of said vehicle means and lowering at said at least one of said stations said portion of said vehicle means, respectively, to and from said at least one of said stations.

3. The transport system, as set forth in claim 1, wherein said track means between said stations and said at least one of said stations are at different levels, and
lifting means disposed in said at least one of said stations for lifting at least a portion of said vehicle means and lowering said portion, respectively, to and from said at least one of said stations.

4. The transport system, as set forth in claim 1, wherein each of said vehicle means includes vehicle entrance and exit doors substantially at the ends of said vehicle means, and
each of said entrance and exit doors of each of said vehicle means independently registering and operable simultaneously with a corresponding of one of said adjacent doors of said block means, respectively, when said vehicle means is in a corresponding station.

5. The transport system, as set forth in claim 1, wherein
said control means comprises means for independently driving each of said separate vehicle means, and
each of said track means in each of said stations includes an independently corresponding one of said adjacent doors exclusively associated with a vehicle means running on said each of said track means.

6. The transport system, as set forth in claim 1, wherein said access and discharge means are at a level different from that of said at least two substantially horizontal track means.

7. The transport system, as set forth in claim 2, wherein said portion of said vehicle means is a platform means, and
said lifting means are disposed between said platform means and the remaining portion of said vehicle means.

8. The transport system, as set forth in claim 1, wherein said adjacent doors are longitudinally offset relative one another in said direction of said track means between said stations of said adjacent ones of said track means.

9. The transport system, as set forth in claim 1, wherein each of said doors are provided on at least one side of said block means which face the direction of said track means, and
said vehicle means includes at least one door registering and operable simultaneously with said door means.

10. The transport system, as set forth in claim 1, wherein said stations are lower than said track means,
means in at least one of said stations for lowering said vehicle means to and raising it from the level of said stations,
supporting means for providing said track means above said level of said stations,
transportation means other than said vehicle means being disposed in said supporting means, and
said supporting means serves as roof means for structures other than said stations.

11. The transport system, as set forth in claim 1, wherein
said stations are lower than said track means,
means in at least one of said stations for lowering said vehicle means to and raising it from the level of said stations,
the level of said stations is at least partly underground and underneath the level of said track means, and
transportation means other than said vehicle means being disposed at said level of said stations.

12. The transport system, as set forth in claim 1, wherein
at least two of said vehicle means are provided on the same one of said track means for independent but consecutive operation and which includes
section blocking means on said one track means.

References Cited

UNITED STATES PATENTS

| 355,927 | 1/1887 | Godefroy | 104—20 |
|---|---|---|---|
| 423,871 | 3/1890 | Judson | 104—166 |
| 1,451,101 | 4/1923 | Morgan | 104—26 |
| 1,550,754 | 8/1925 | Sockman | 104—38 |
| 1,645,026 | 10/1927 | Sachs | 104—28 |
| 1,820,034 | 8/1931 | Schuberth | 104—27 |
| 1,827,898 | 10/1931 | Moore | 105—215 |
| 2,088,655 | 8/1937 | King | 105—1 |
| 3,247,947 | 4/1966 | Fox | 104—25 |
| 3,265,010 | 8/1966 | Makiri | 104—25 |

ARTHUR L. LA POINT, *Primary Examiner.*

D. F. WORTH, *Assistant Examiner.*